US008402433B2

(12) United States Patent
Wood et al.

(10) Patent No.: US 8,402,433 B2
(45) Date of Patent: Mar. 19, 2013

(54) METHOD AND SYSTEM FOR PERFORMING AUTOMATED TRANSACTIONS USING A SERVER-SIDE SCRIPT-ENGINE

(75) Inventors: Eric Wood, Menlo Park, CA (US); Boris Tsyganskiy, Los Gatos, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1580 days.

(21) Appl. No.: 10/850,906

(22) Filed: May 21, 2004

(65) Prior Publication Data

US 2005/0262021 A1 Nov. 24, 2005

(51) Int. Cl.
*G06F 9/44* (2006.01)
(52) U.S. Cl. ........................................... 717/115
(58) Field of Classification Search .................... None
See application file for complete search history.

(56) References Cited

U.S. PATENT DOCUMENTS

| | | | | |
|---|---|---|---|---|
| 5,604,896 A | * | 2/1997 | Duxbury et al. | 703/26 |
| 5,692,198 A | * | 11/1997 | Ushiku | 712/208 |
| 5,978,834 A | * | 11/1999 | Simonoff et al. | 709/203 |
| 6,078,321 A | * | 6/2000 | Simonoff et al. | 715/744 |
| 6,101,478 A | * | 8/2000 | Brown | 705/2 |
| 6,282,699 B1 | * | 8/2001 | Zhang et al. | 717/109 |
| 6,735,586 B2 | * | 5/2004 | Timmons | 707/3 |
| 7,007,266 B1 | * | 2/2006 | Isaacson | 717/100 |
| 2003/0140045 A1 | * | 7/2003 | Heninger et al. | 707/10 |
| 2003/0182169 A1 | * | 9/2003 | Kalmick et al. | 705/8 |
| 2003/0217076 A1 | * | 11/2003 | Heptinstall et al. | 707/104.1 |
| 2003/0236577 A1 | * | 12/2003 | Clinton | 700/10 |
| 2004/0148228 A1 | * | 7/2004 | Kwei | 705/26 |
| 2005/0262021 A1 | * | 11/2005 | Wood et al. | 705/44 |

\* cited by examiner

*Primary Examiner* — Li B Zhen
*Assistant Examiner* — Evral Bodden
(74) *Attorney, Agent, or Firm* — Blakely Sokoloff Taylor & Zafman, LLP

(57) ABSTRACT

A method and an apparatus for performing automated transactions are disclosed. According to one aspect of the present invention, a script-engine associated with a particular server receives a request to execute a script. The script-engine executes a script and prompts a user to enter critical data directly related to the goal sought to be achieved by the script. After receiving the critical data related to the transaction, the script automatically executes and communicates commands to a server. The script automatically communicates the critical data to the server upon request by the server. In addition, the script retrieves and enters non-critical data without user interaction. The server performs operations according to the commands received from the script-engine to automatically carry out the transaction.

26 Claims, 12 Drawing Sheets

METHOD AND SYSTEM FOR PERFORMING AUTOMATED TRANSACTIONS USING A SERVER-SIDE SCRIPT-ENGINE

FIELD OF THE INVENTION

The present invention relates generally to enterprise resource planning servers, and more particularly to executing automated transactions.

BACKGROUND OF THE INVENTION

Software applications in the field of enterprise resource planning ("ERP") attempt to integrate all facets of a business including planning, manufacturing, sales, and marketing. As the ERP methodology has become more popular, software applications have emerged to help business managers implement ERP in business activities such as inventory control, order tracking, customer service, finance and human resources. Because ERP systems attempt to encompass all aspects of a business, they often tend to be extremely complex and multifaceted with large data repositories. Consequently, the user interface experience can sometimes be complex as well.

Frequently, a user attempting to execute a business transaction (e.g., entering a new employee into a human resources database) on an ERP server must perform several tasks or steps that seem unrelated to the ultimate goal of the transaction. For example, many transactions require the user to enter configuration data that does not have an obvious relationship to the end-goal the user is attempting to achieve. Often times this is due to the intricate and complex data dependencies of the underlying data repository and the interrelated components that make up the ERP system.

A second drawback with existing ERP systems is the inability to automate repetitive tasks. For example, a user may have to enter data manually while performing several steps to complete a single transaction. Furthermore, the user might have to repeatedly perform that transaction several times over a given time period. Without the ability to somehow automate the process, the user is faced with the tedious and time-consuming task of manually entering data. The repetitive nature of the manual data entry is not only tiresome for the user, but it also makes the process more prone to mistakes. The problems associated with prior art ERP systems are further described with reference to FIGS. 1 and 2.

In a traditional ERP environment 100, such as that illustrated in FIG. 1, a user accesses a server 105 and initiates a user session via a client application running on a client 120. The client application is generally a thick client, having significant functionality and intelligence built-in. Using the client 120, the user executes transactions on the server 105 to manipulate data 110.

FIG. 2 is a block diagram illustrating a prior art process 210 by which a user might complete a business transaction 202 in a prior art ERP environment. In FIG. 2, the step of initiating a user session is illustrated as step 1 by the square box labeled with the number "1." Each of the boxes illustrated in FIG. 2 represents a step in a business transaction. The example transaction includes six steps in total, two of the steps having sub-steps associated with different processes. In addition, sub-steps 3.1 and 3.2 occur on a different system, SYSTEM 2. Steps *2 and *4 are flagged with asterisks to denote their special status as steps requiring critical data. Critical data may include data that is unique to the transaction and is directly related to an end-goal 208 of the transaction.

For example, if business transaction 202 represents adding a new employee to a human resources database, critical data may include the employee's name and other personal information as well as the employee's wage or salary information. After initiating the user session and selecting to add a new employee at step 1, step *2 may involve entering the employee's name, address and other personal information into the system. Step 3, and sub-steps 3.1 and 3.2 in particular, involve process 204 on SYSTEM 2. For example, steps 3, 3.1 and 3.2 might require initiating a user session on SYSTEM 2 to add the new employee to a database specific to a particular department before moving on to step *4. Step *4, marked with the asterisk, may involve entering additional critical data, for example, the wage or salary information for the employee. Step 5, which requires interaction with process 2, might require entering the date when the payroll system was last run. While the last date that payroll was run seems to have little bearing on adding a new employee to a human resources database, such data is often required due to the complex data dependencies of traditional ERP systems. As such, step 5 might require running a payroll process. This is indicated in FIG. 2 as process 206. After the payroll date has been entered at step 5, additional configuration data is entered at step 6 before the end-goal 208 is reached.

As such, the example business transaction illustrated in FIG. 2 contains six steps; however, only steps 2 and 4 require critical data directly associated with the end-goal 208 of the transaction. The other steps involve entering non-critical and configuration data. Consequently, the end-user is faced with monotonous and tedious data entry tasks that are not obviously related to the end-goal 208.

SUMMARY OF THE INVENTION

A method and system to perform automated transactions are provided. According to one aspect of the invention, a request is received to execute a script that is associated with a particular script-engine. The script-engine receives the script or script commands and translates the commands into server-specific commands for a server. In addition, the script-engine prompts a user to input critical data associated with key server operations. The script-engine communicates the server-specific commands to the server, which performs operations, according to the commands, to execute a transaction. The script-engine automatically provides the critical data to the server so that the server can perform the key operations without user interaction. Furthermore, the script-engine is capable of retrieving non-critical data and providing non-critical data to the server when requested. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to perform automated transactions are described. In the following description, for purposes of explanation, numerous specific details are set forth in order to provide a thorough understanding of the present invention. It will be evident, however, to one skilled in the art that the present invention may be practiced without these specific details.

Throughout the detailed description, the particular example transaction of entering a new employee into an employee human resources database is used. This data entry task is used solely as an example of one of the many types of transactions that can be automated and performed with scripts according to the present invention. A person skilled in the art will recognize the broad spectrum of uses for the present invention beyond the examples discussed herein.

Figure 1:
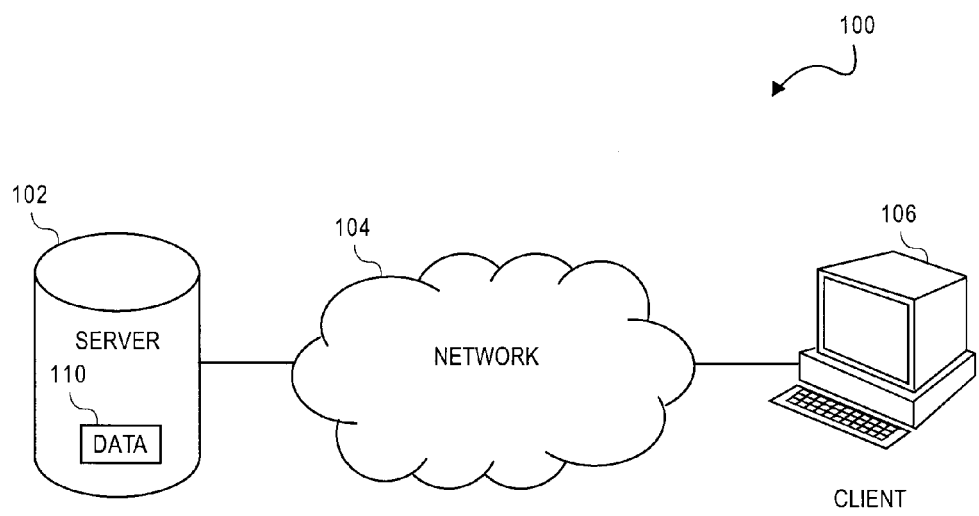
FIG. 1 illustrates a prior art ERP system in a traditional client-server environment.
Figure 2:
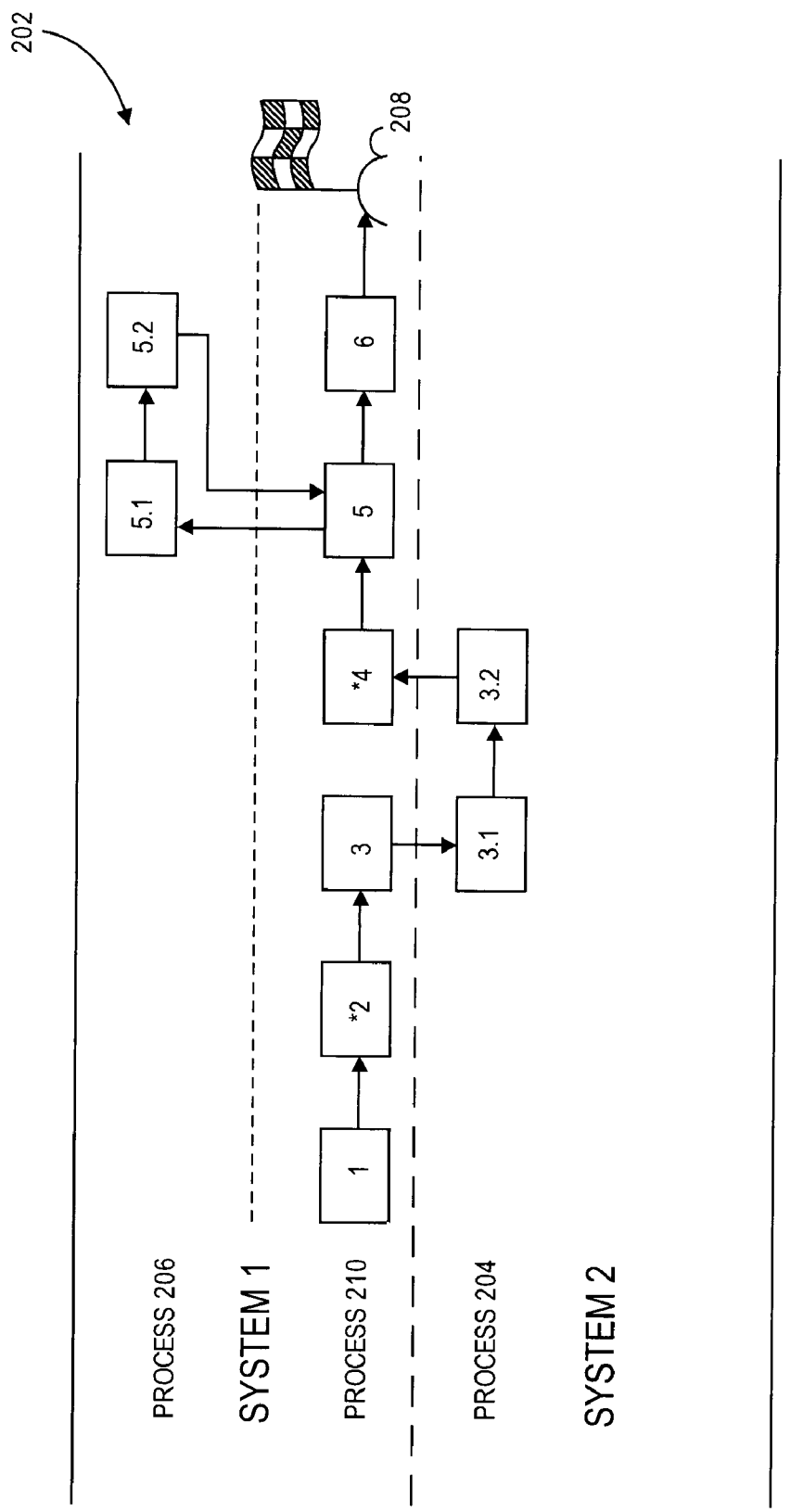
FIG. 2 shows a transaction flow diagram, illustrating the transaction operations required to complete a transaction in a prior art ERP system.
Figure 3:
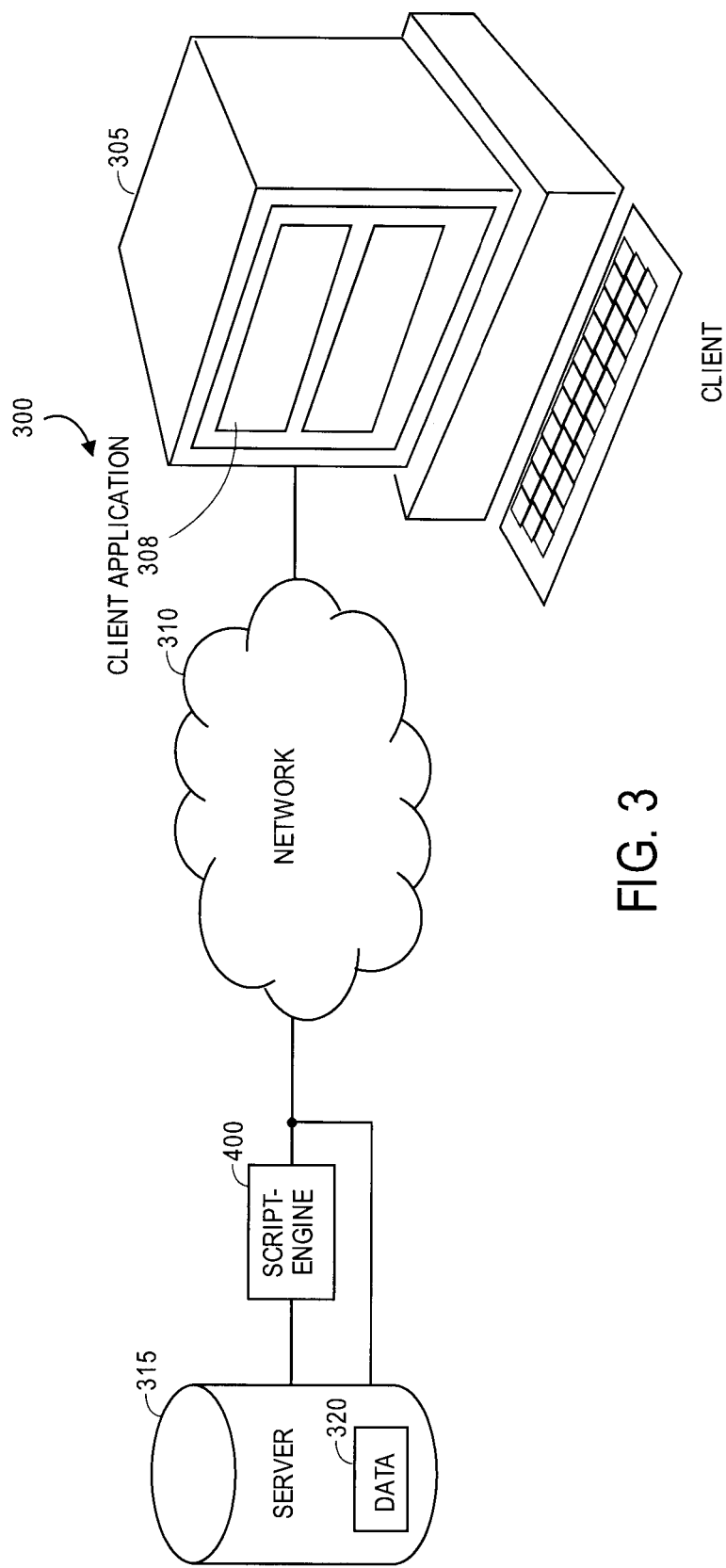
FIG. 3 shows a block diagram view of a simple client-server ERP environment, including a server-side script-engine consistent with one embodiment of the present invention.

FIG. 3 shows a block diagram view of a simple client-server ERP environment 300, including a server-side script-engine 400 consistent with one embodiment of the present invention. In FIG. 3, client 305 is connected to server 315 and script-engine 400 via network 310. Network 310 could be any type of network including a local area network (LAN) or a wide area network (WAN). Consistent with the present invention, a user interacts with a client application 308 executing on client 305 to execute automated scripts and/or script commands associated with script-engine 400. The automated scripts and/or script commands execute on script-engine 400, which issues system-specific commands to server 315 to access and manipulate data 320. The scripts and/or script commands allow a user to automatically perform a series of operations on server 315 by executing a single script command.

For one embodiment of the present invention, client 305 in FIG. 3 is a desktop personal computer. In an alternative embodiment, client 305 could be any computing device, including a laptop or notebook computer. The client application that executes on client 305 might be a thick client having significant functionality and intelligence built-in, or alternatively, a thin client such as an extensible mark-up language (XML) application, or a simple web browser.

In FIG. 3, script engine 400 is shown as a separate component or module from server 315. However, for one embodiment of the present invention, script engine 400 is a system level service or other process executing on server 315. In an alternative embodiment, script engine 400 is a software module that executes on a separate computer and communicates with server 315 via a network connection. Regardless of the implementation, script engine 400 is closely associated with server 315.

In one embodiment of the present invention, the client application on client 305 presents the user with a graphical user interface by which the user interacts with server 315 and script-engine 400 in particular. Alternatively, the user interface might be a simple command line interface. A user initiates a user session by entering user credentials at client 305 and logging in to server 315. After initiating a user session, a user initiates a script engine session. A script-engine session may be initiated by selecting an icon or menu item in a graphical user interface at client 305. Alternatively, a script-engine session might be initiated by entering a command at a command line interface. During a script engine session a user can execute a script or script command to perform a series of operations on server 315.

A script comprises a series of script commands and associated data for performing a particular task on server 315. For example, data 320 on server 315 might be related to the human resources department of a particular business. A user might want to add a new employee to a database storing data 320 on server 315. The present invention allows a user to bypass direct interaction with the user interface of server 315 by executing a single script to perform multiple operations required to complete a task.

Figure 4:
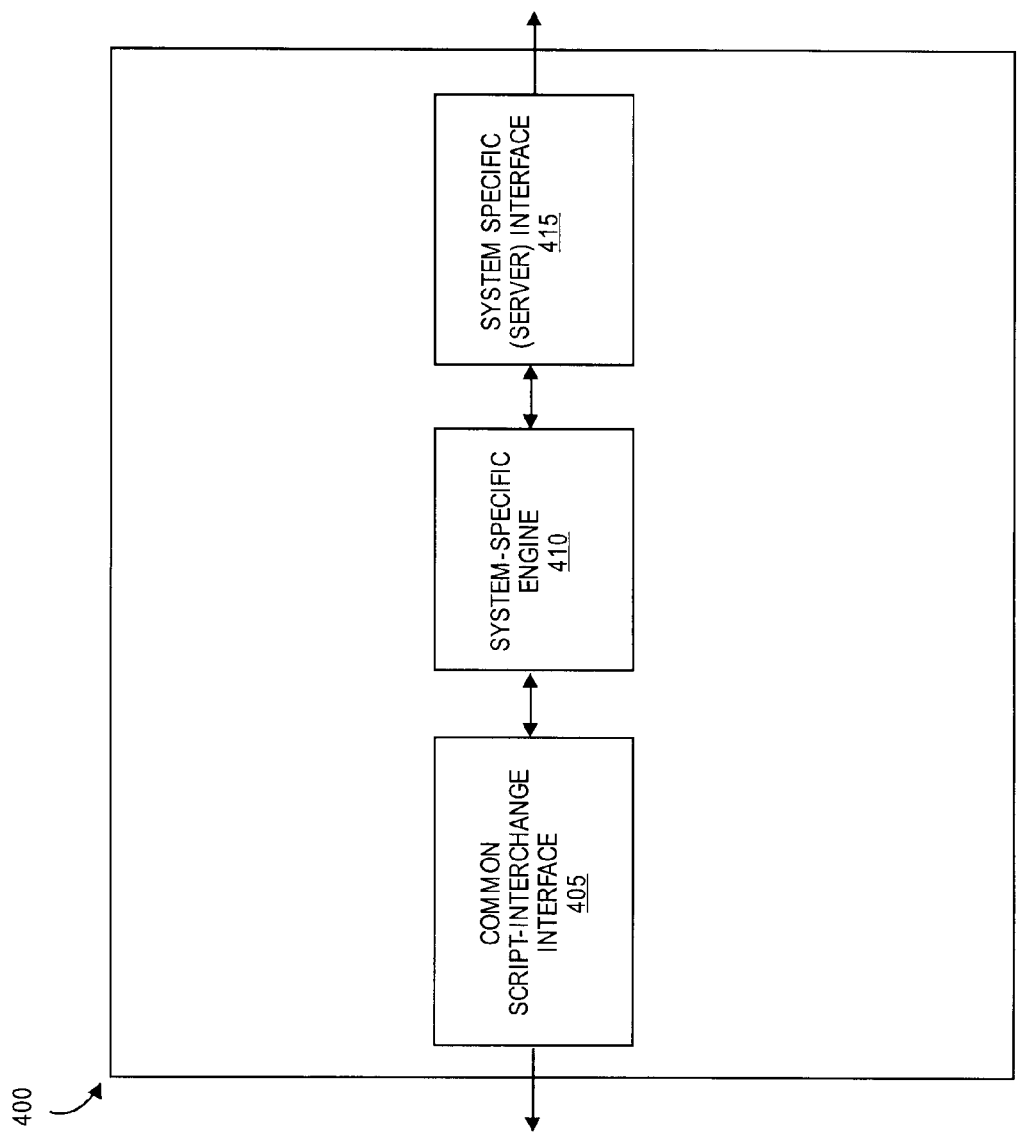
FIG. 4 illustrates a block diagram view of a script-engine consistent with one embodiment of the present invention.

FIG. 4 illustrates a block diagram view of a server-side script-engine 400 consistent with one embodiment of the present invention. Script engine 400 includes a common script-interchange interface 405, a system-specific engine 410, and a system-specific interface 415. A client application executing on a client, such as client 305 in FIG. 3, communicates with script engine 400 via the script engine's common script-interchange interface 405. The script engine 400 communicates with a server, such as server 315 in FIG. 3, via system-specific interface 415.

At common script-interchange interface 405, script engine 400 receives script commands. The script commands are in a format referred to as the common script-interchange format. The present invention is advantageous in part because the common script-interchange format is independent of the particular server to which the script engine 400 is connected. For example, system-specific engine 410 interprets the commands received at common script-interchange interface 405 and translates these "generic" script commands to system-specific commands. At system-specific interface 415, the translated script commands are communicated to a server as system-specific commands.

Figure 5:
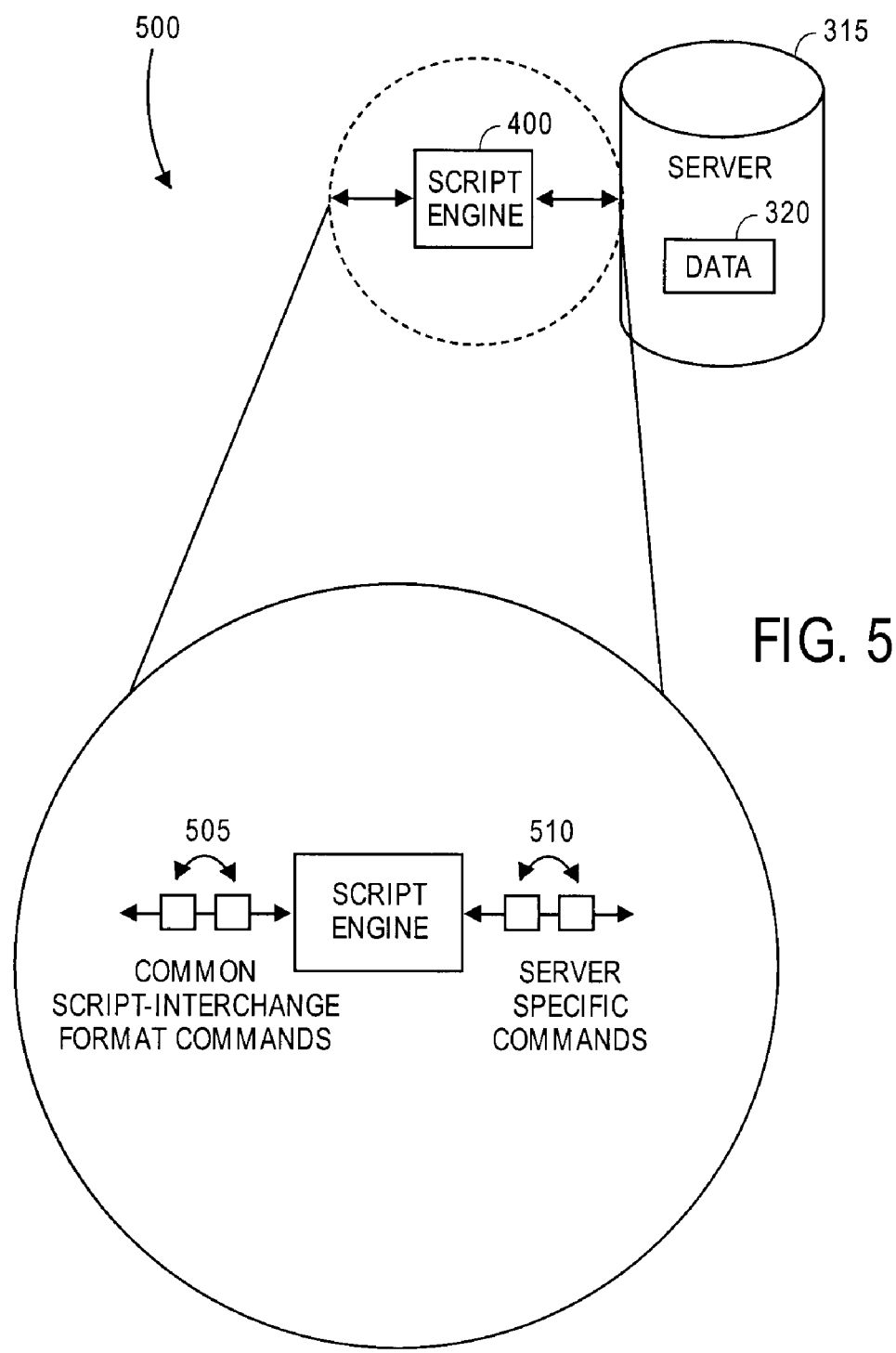
FIG. 5 is a blown-up view of one embodiment of a server-side script-engine illustrating the input and output interface communications.

FIG. 5 is a blown-up view 500 of one embodiment of a server-side script-engine 400 illustrating the input and output interface communications. As illustrated in FIG. 5, script engine 400 receives and transmits common script-interchange format commands 505. Similarly, script engine 400 communicates server-specific commands to server 315 and receives server-specific commands from server 315. One primary function of script engine 400 is to translate or interpret commands. For example, script engine 400 receives a common script-interchange command 505 and translates the command to a server specific command 510 before communicating the command to server 315.

In addition, script engine 400 can also receive data and/or commands 510 from server 315 and interpret and act on those commands accordingly. For example, for one embodiment of the present invention, script engine 400 has built-in logic to perform typical branching and decision-making operations, such as if-then-else, jump and goto operations.

Figure 6:
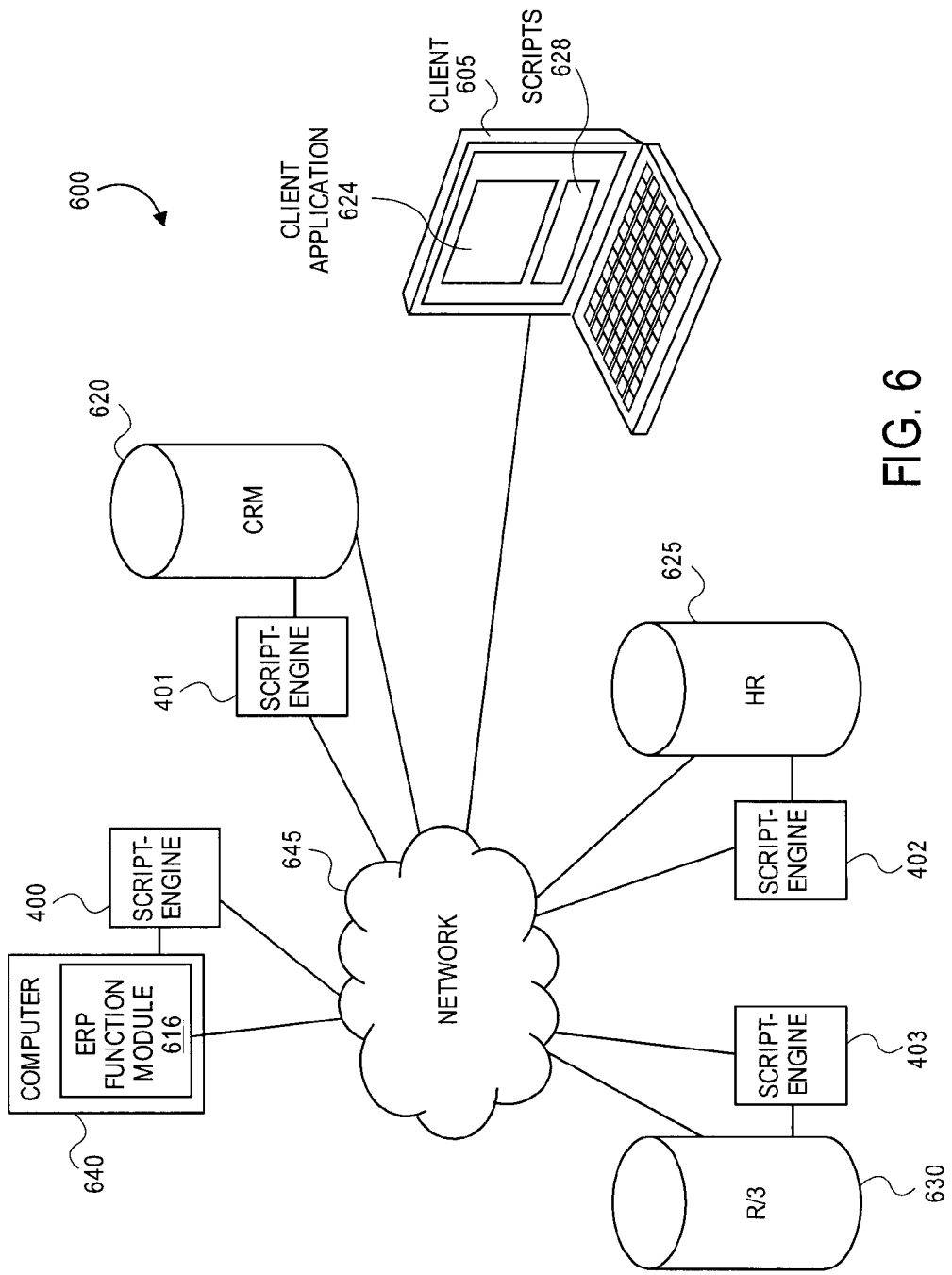
FIG. 6 shows a block diagram view of an ERP system in which the present invention can be used.

FIG. 6 shows a block diagram view of an ERP environment 600 in which the present invention can be used. ERP environment 600 includes ERP system servers 620, 625 and 630 with associated script-engines 401, 402 and 403. ERP environment 600 also includes a computer 640 executing an ERP function module. Computer 640 has a script-engine 400 associated with the ERP function module. One exemplary ERP function module is an application used to download and analyze business related data that is collected and stored on remote servers, such as ERP Systems 620, 625, or 630. For one embodiment, each ERP system server and each associated script engine are inter-connected via network 645. Network 645 can be any type of network including a LAN or a WAN.

In one exemplary embodiment of the present invention, each ERP system server 620, 625 and 630 will provide services specific to a single department within an organization. For example, server 620 may provide customer relationship management (CRM) services for a sales and/or marketing department, while server 625 provides human resource (HR) services for a human resources department. Similarly server 630 may provide any of the business functions or services provided by an SAP® R/3® server or functional module. One with knowledge of ERP systems will recognize that the present invention is independent of the particular server software used and could be implemented to work with a wide variety of existing vendor server and application software as well as newly developed software applications.

Each server 620, 625, 630, and ERP function module 640 has an associated server-side script-engine 400 designed specifically to work with it. For example, script-engine 401 in FIG. 6 has a system-specific interface by which it connects to server 620. Each script-engine also has a script-interchange format interface through which it receives script-interchange commands. As such, each script-engine translates "generic" commands, in script-interchange format, into system-specific commands associated with the specific server to which it is attached. Consequently, one of the advantages of the invention is that scripts are interchangeable. For example, for one embodiment of the present invention, a script written for one server will work on any other server.

Another advantage of the present invention is the ability of each script-engine to automatically retrieve data from any server on the network. For example, in response to a command from script engine 402, ERP System 625 might request data from a remote server. ERP System 625 issues the request for data to script-engine 402. In response to the request, script-engine 402 retrieves the data from the appropriate source. ERP System 625 does not need to have prior knowledge of the location of the particular data. Instead, script-engine 402 can identify the proper location of the data based on the script and the request for data received from ERP system 2. If required, script engine 402 can execute a script or script command on a remote script engine to retrieve the data. For example, script-engine 402 might transmit a script or script command to script-engine 403. In response, script-engine 402 will execute a script and communicate commands to ERP system 630. ERP system 630 will perform the operations and return the requested data to script-engine 403, which will in turn, route the data to script-engine 402. Script-engine 402 will then have the data to present to ERP system 625.

For one embodiment of the present invention, a script is stored on and executed by client 605. For example, a user selects a particular script to execute from a variety of scripts 628 that are stored on client 605. The script is then parsed by a client application 624 and the individual script commands that make up the script are communicated to one of script engines 400, 401, 402, or 403, one command at a time. In an alternative embodiment, the script is stored on one of servers 620, 625, or 630, and the server communicates the individual script commands to script engine 400, one command at a time. In another embodiment, scripts are stored in a centralized script library (not shown) accessible via the network.

After a server has received a command and performed the server operation associated with the command, the server communicates the result, if any, to the script engine that is executing the script. For example, a specific server command may direct the server to perform an operation to lookup and retrieve some data from data 320. Server 315 will retrieve the data from the database and communicate the data to script engine 400. Script engine 400 will receive the data at system-specific interface 415.

Similarly, a server may require data from an external source to complete an operation associated with a system-specific command. For one embodiment of the invention, after receiving a command, a server determines whether the command requires data from an external data source to complete the operation associated with the command. If the server does require external data, the server communicates a request for the data to the executing script engine via the script engine's system-specific interface 415. Server specific engine 410 has built-in logic to interpret the request for data received from the server. For example, based on the data requested, system-specific engine 410 can issue a command or execute a script to retrieve the data from an external source.

Figure 7:
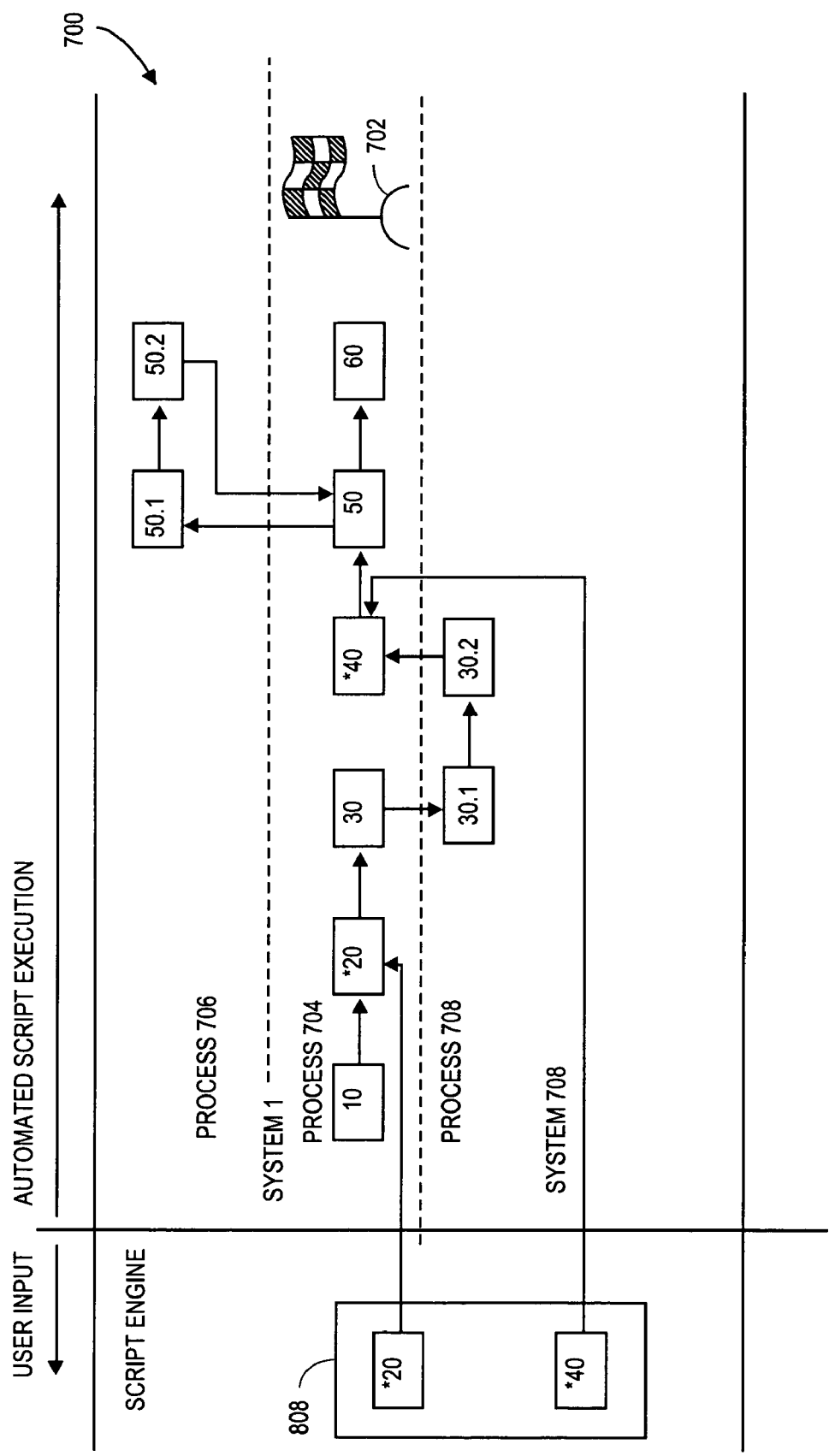
FIG. 7 illustrates, in the abstract, the steps performed to complete an automated transaction for one embodiment of the present invention.
Figure 8:
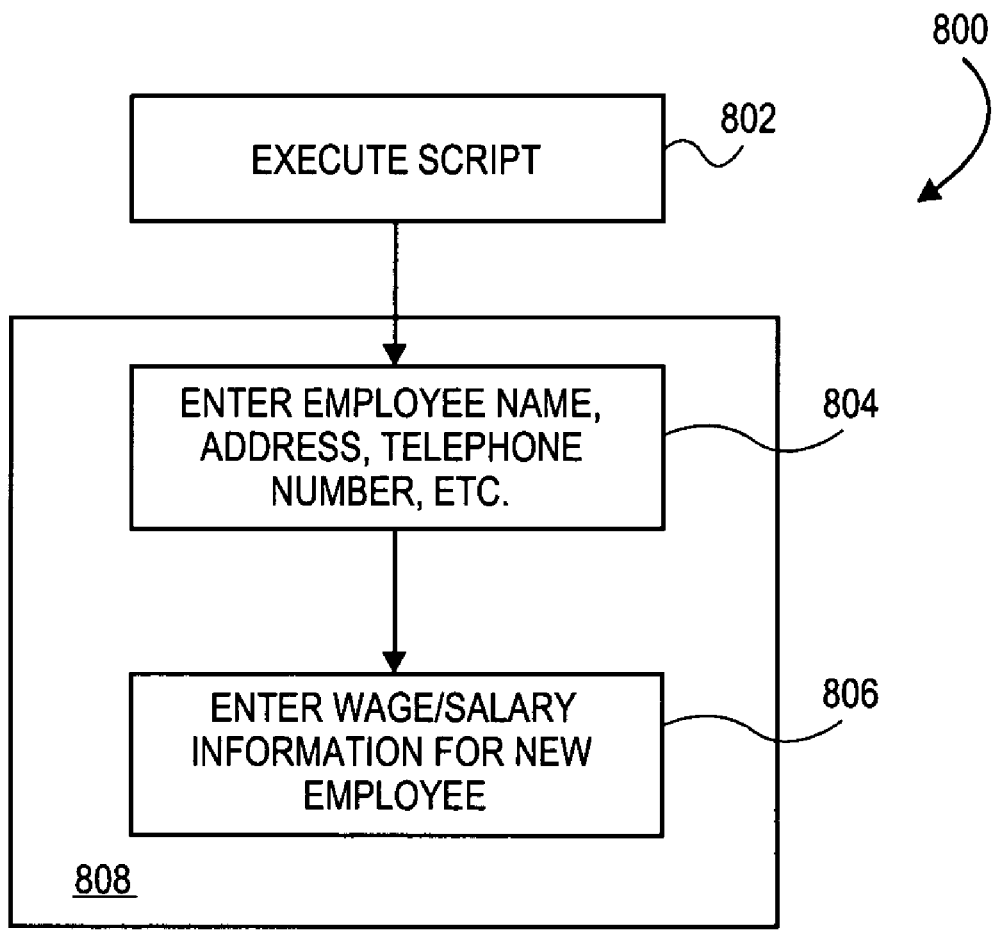
FIG. 8 illustrates the steps required to perform an exemplary automated transaction from the perspective of the user.
Figure 9:
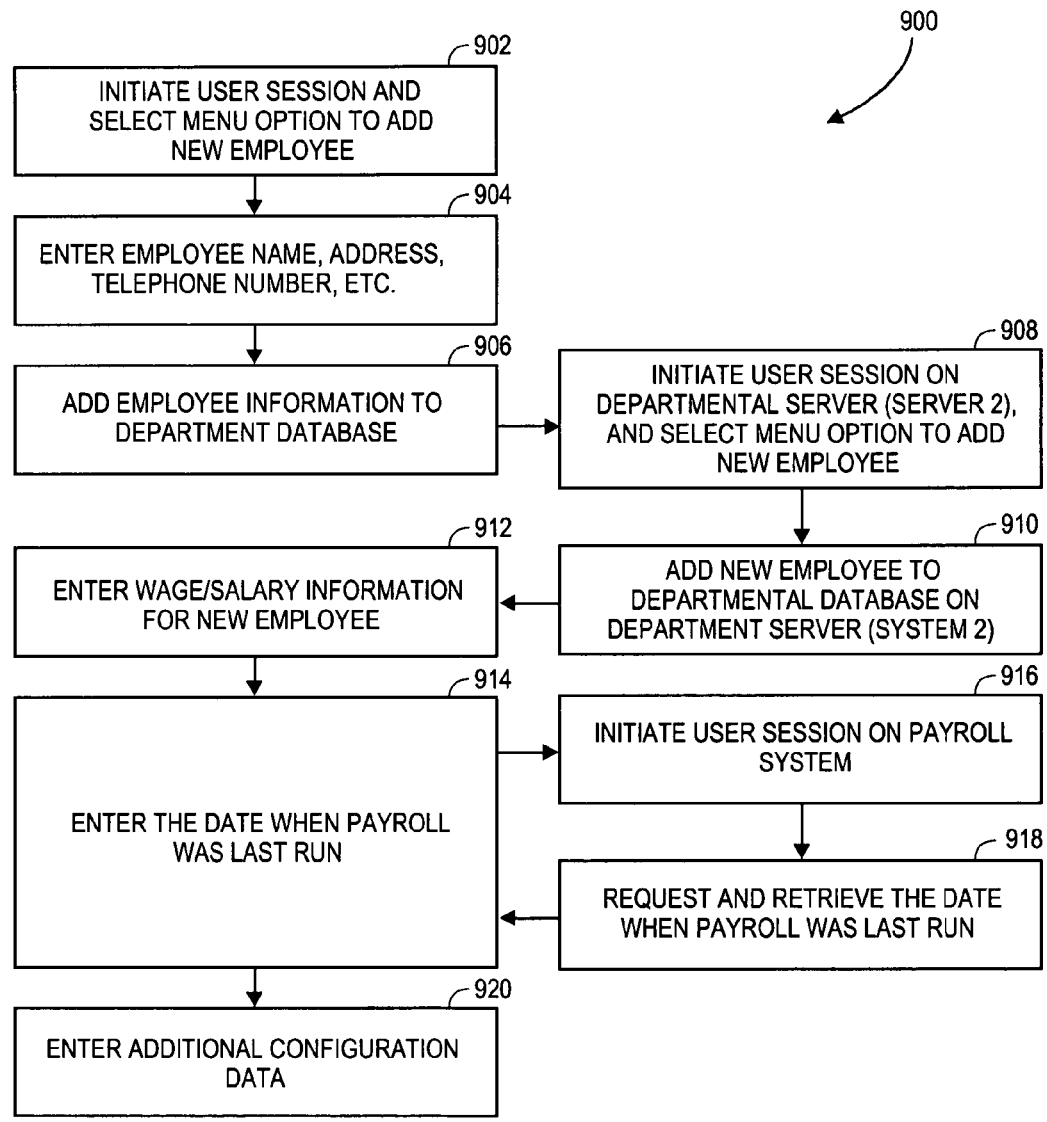
FIG. 9 illustrates the automated operations performed by the server as a result of executing a script consistent with the exemplary automated transaction described in FIGS. 7 and 8.

FIGS. 7, 8 and 9 illustrate the steps required to perform a transaction consistent with one embodiment of the present invention. FIG. 7 illustrates the steps in an abstract manner showing the relationship of the different systems and processes involved in carrying out the operations on each server. FIGS. 8 and 9 illustrate a particular example of an automated transaction consistent with the abstract steps illustrated in FIG. 7. For example, FIG. 8 illustrates the steps required to perform the automated transaction from the perspective of a user. FIG. 9 illustrates the corresponding server operations required to add a new employee to an ERP system. The particular transaction illustrated in FIGS. 7, 8 and 9, is simply one example of the many types of transactions that might be automated according to the invention and is in no way meant to limit the scope of the present invention.

FIG. 7 illustrates, in the abstract, the steps performed during an automated transaction 700 for one embodiment of the present invention. Each of the numbered boxes illustrated in FIG. 7 represents a step in a transaction. The transaction illustrated in FIG. 7 involves six different steps. Each step requires one or more operations to be carried out on a server. For example, in FIG. 7, the step of initiating a user session is illustrated as step 10 by the square box labeled with the number "10." The step is carried out by performing several operations, for example, requesting a log-in prompt, inputting a username and password, and submitting the username and password to the server for verification.

Furthermore, steps 30 and 50 include two sub-steps. A sub-step represents a portion of an operation required to complete the whole operation. For example, step 50 might require the input of data into a database. However, before inputting the data, it must be retrieved from a different database. Sub-step 50.1 represents logging into a second database process and sub-step 50.2 represents retrieving the required data from the second database.

Steps *20 and *40 are flagged with asterisks to denote their special status as steps requiring critical data. Critical data may include data that is unique to the transaction and is directly related to an end goal of the transaction.

For example, as will be discussed in greater detail with respect to FIG. 8, critical data might include the employee's name and address as well as the employee's pay status. Each of these items of data in a traditional ERP system would be entered sequentially at steps *20 and *40. However, in accordance with the present invention, the script requests the critical data from the user before executing the sequential steps in the transaction. Consequently, when the script is executed and the data is entered, the script can automatically execute and enter the critical data at the critical transaction steps.

FIG. 8 illustrates the steps 800 required to perform the automated transaction of FIG. 7 from the perspective of the user. For example, at step 801, the user executes a script to add a new employee to the ERP system. At step 805, the user is prompted for and enters all of the critical data associated with entering the new employee into the system including the data associated with steps *20 and *40 in FIG.'s 6 and 8. Specifically, the user enters the employee's name, address telephone number, and salary/wage information. Once the critical data is entered, the script automatically executes and provides the user-entered data to the server when prompted. In addition, the script provides to the server any non-critical data including redundant data and/or any configuration data that might be required to perform the task.

FIG. 9 illustrates an example of a particular automated transaction consistent with the abstract steps of FIG. 7. In FIG. 9, the same 6 steps shown in FIG. 7 are shown with details about the actual operations that are carried out by the server to add an employee to an ERP system. The steps shown in FIG. 9 are performed automatically after a script has been executed and the user has entered any critical data that may be required in order for the server to perform a particular operation. For example, the operations set forth in FIG. 9 are the result of the steps taken by the user as illustrated in FIG. 8.

Referring to FIG. 9, at step 902, the script automatically initiates a user session and selects a menu option to add a new employee into the ERP system. At step 904, the server prompts the script to enter data about the employee. The data is considered critical data because the employee information is directly related to the task the user is performing. For example, the user has selected to add a new employee to the ERP system and would therefore naturally expect to be prompted to enter the data about the employee.

At step 906, the new employee data is added to a database in a specific department. For example, after adding the employee into the ERP system, the new employee might need to be added manually to a department database, such as the marketing department. To add the new employee data to the marketing department database, at step 908, the script performs an operation to initiate a user session on the marketing department server and selects from a menu an option to add a new employee. At step 910 the script enters the employee data into the marketing department database. The data entered at step 910 is considered non-critical data because it is redundant. For example, the data has already been entered once.

At step 912, the server issues a prompt for wage/salary information about the new employee. Having already captured the data from the user, the script transmits the data to the server in response to the prompt. The data entered at step 912 is considered critical data because it is directly related to the task the user has selected and the user would naturally be expected to enter the data as part of the task.

At step 914, the server issues a prompt to enter data corresponding to when the payroll was last run. In a traditional ERP system, this would require that the user look up the date when the payroll was last run. However, consistent with the present invention, the script performs the operation automatically. At step 916, the script initiates a user session on the payroll system. The script issues a command requesting the date at step 918 and then enters the date at step 914.

Finally, at step 920, the server prompts the script to enter some other configuration data and the script automatically enters the configuration data. Configuration data is non-critical because it is not directly related to the task that the user has selected, but instead, the configuration data is necessary due to the complex data dependencies of the ERP system.

A primary advantage of the present invention is that it reduces the number of steps the user must perform to complete routine tasks. This is accomplished, in part, by automating the steps that require the input of non-critical data, such as data that is redundant and/or configuration data that is not directly related to the task the user has chosen. For one embodiment of the present invention, a user will execute a script and be asked to enter all of the critical data associated with the task. The user will directly input the data, or alternatively, the user might enter the location of a file containing the pertinent data. After entering all of the critical data, the script will automatically execute and provide the critical data to the server when requested. In addition, when the script is prompted for non-critical data, such as redundant data or configuration data, script-engine 400 can automatically retrieve the data and supply the data to the requesting server.

Figure 10:
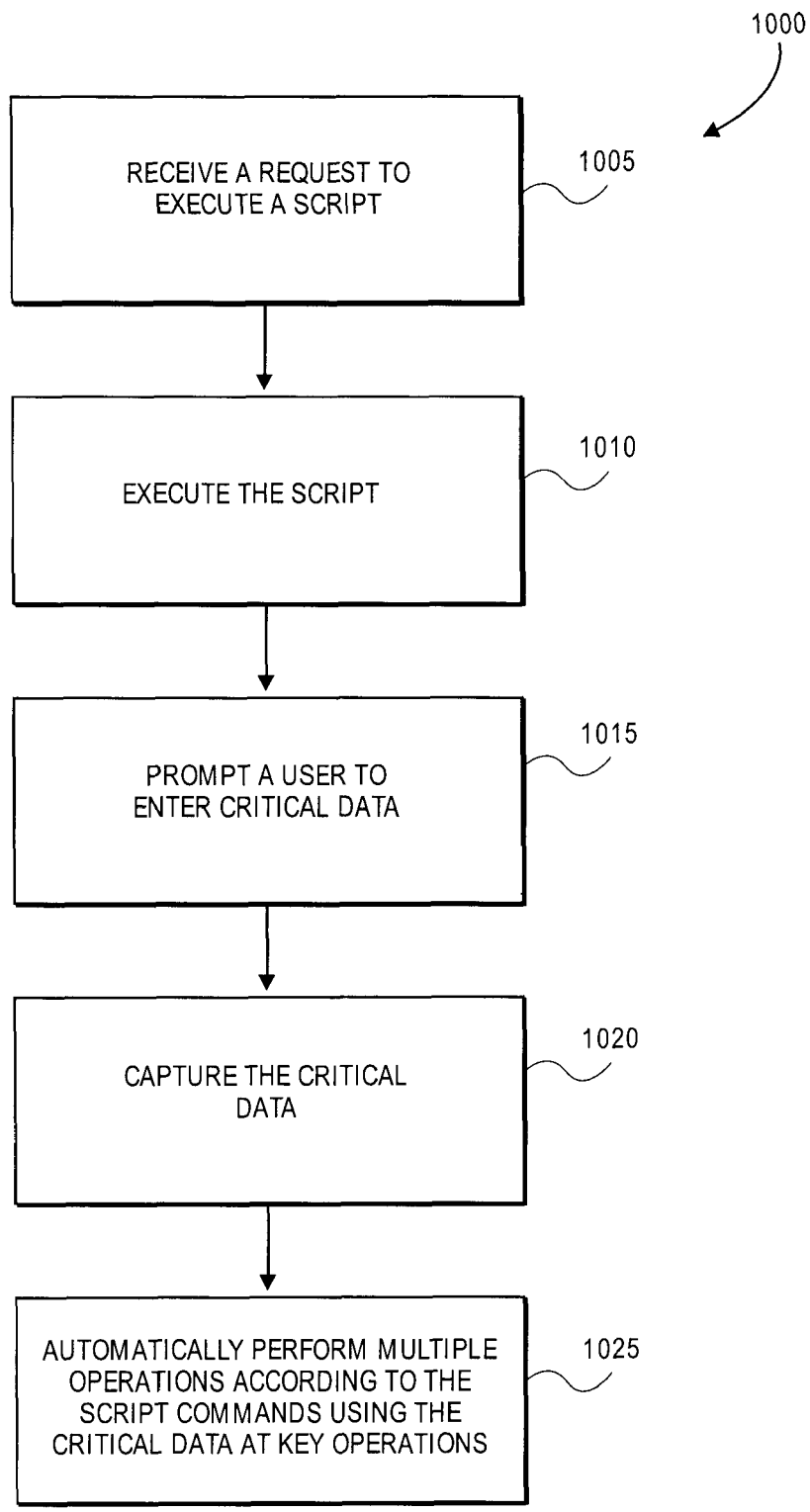
FIG. 10 illustrates a flow chart, consistent with one embodiment of the present invention, for a method to perform an automated transaction.

FIG. 10 illustrates a flow chart, consistent with one embodiment of the present invention, for a method to perform an automated transaction. At step 1005, a request is received from a user to execute a script. For one embodiment, the request is received at a server. However, in an alternative embodiment, the request is received directly by a client application or a script-engine.

At step 1010, a script is executed. In one embodiment, the script is communicated to the script engine and then parsed to separate and execute individual commands. However, in an alternative embodiment, the script is communicated from a remote node (e.g., a server, a client, or a script library) to the script-engine, one command at a time.

At step 1015, the script-engine prompts the user to enter any critical data that is necessary to perform the transaction associated with the script. Accordingly, at step 1020, the script captures the critical data that is input by the user. Finally, at step 1025, the server automatically performs one or more operations based on commands issued to the server from the script-engine.

Figure 11:
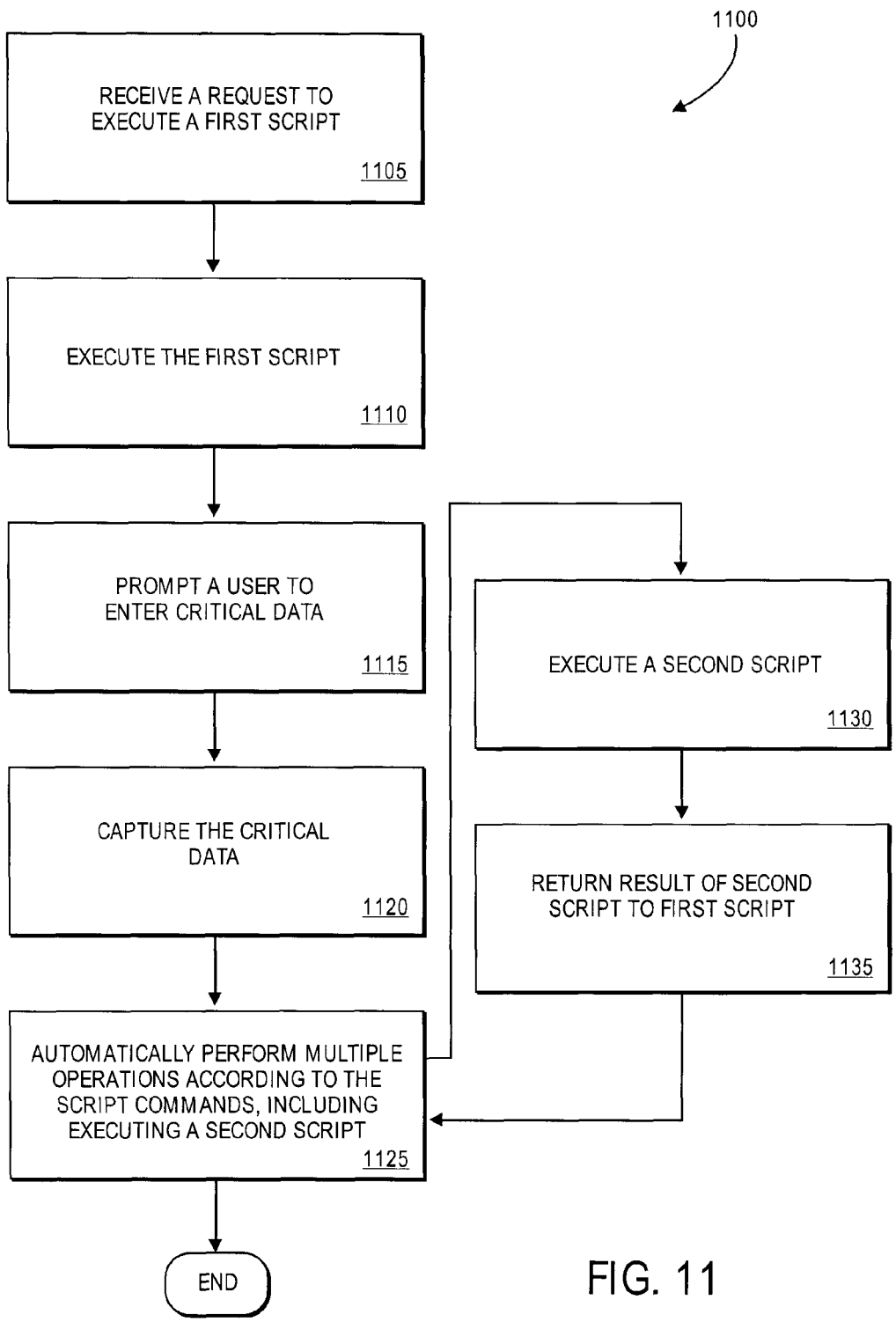
FIG. 11 illustrates a flow chart, consistent with one embodiment of the present invention, for a method to perform an automated transaction using two scripts.

FIG. 11 illustrates a flow chart for a method to perform an automated transaction using two scripts for one embodiment of the invention. Similar to the method illustrated in FIG. 10, at step 1105, a request is received from a user to execute a script. For one embodiment, the request is received at a server. However, in an alternative embodiment, the request is received directly by a client application or a script-engine.

At step 1110, a script is executed. In one embodiment, the script is communicated to the script engine and then parsed to separate and execute individual commands. However, in an alternative embodiment, the script is communicated from a remote node (e.g., a server, a client, or a script library) to the script-engine, one command at a time.

At step 1115, the script-engine prompts the user to enter any critical data that is necessary to perform the transaction associated with the script. Accordingly, at step 1120, the script captures the critical data that is input by the user. At step 1125, the server automatically performs one or more operations based on commands issued to the server from the script-engine. As part of step 1125, the server issues a command to execute a second script. For one embodiment, the command may be communicated to the same script-engine that issued the original command. However, in an alternative embodiment, the command to execute a second script will be communicated to a remote script-engine and an associated remote server.

At step 1130, a second script is executed. At the completion of the second script, a result generated by the second script is communicated to the first script. Once received by the first script-engine, the result can be communicated to the server associated with the first script when necessary, at 1135.

Figure 12:
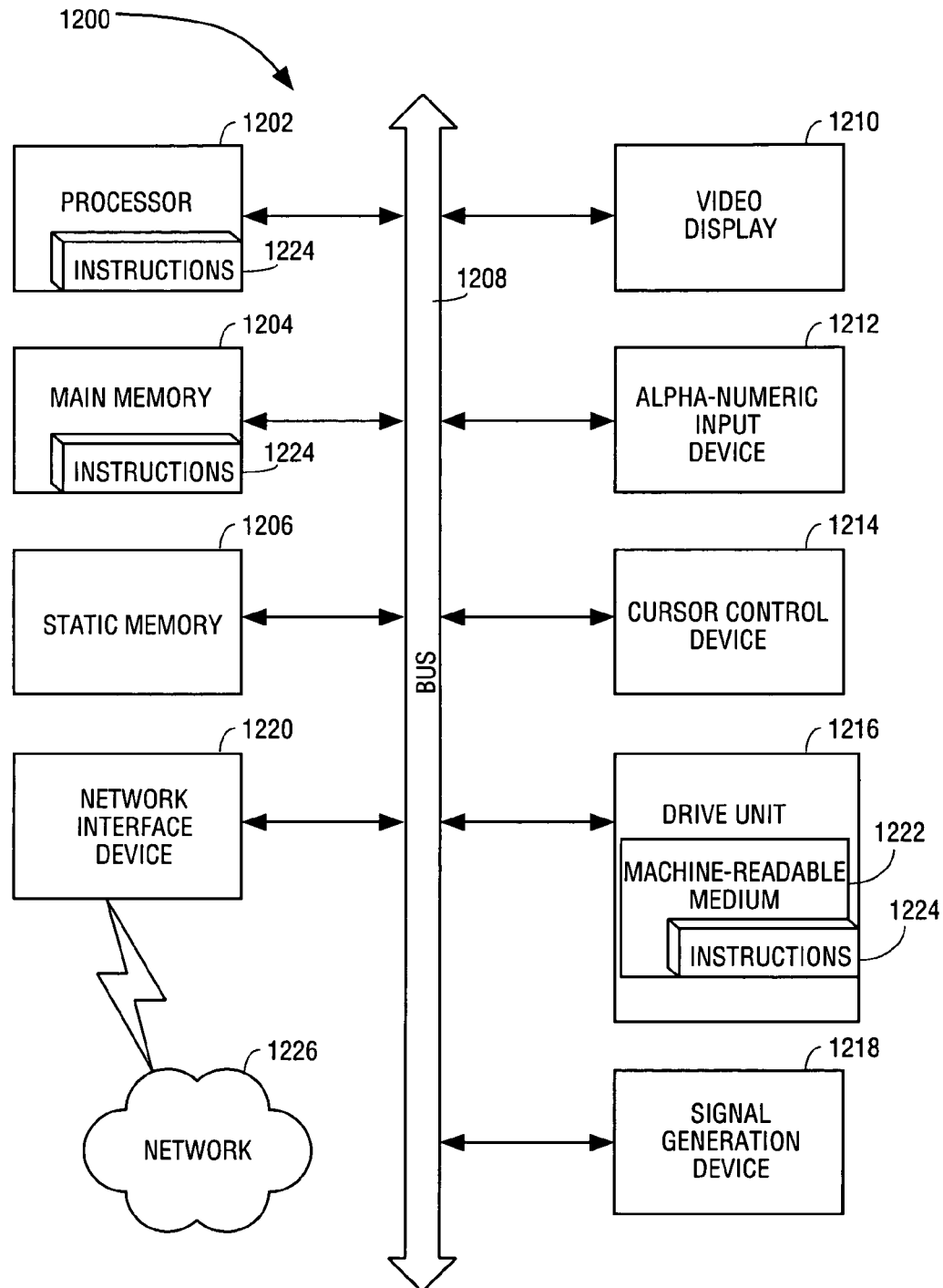
FIG. 12 illustrates a diagrammatic representation of machine in the exemplary form of a computer system within which a set of instructions, for causing the machine to perform any one or more of the methodologies discussed herein, may be executed.

FIG. 12 illustrates a diagrammatic representation of machine in the exemplary form of a computer system 1200 within which a set of instructions, for causing the machine to perform any one or more of the methodologies discussed herein, may be executed. In alternative embodiments, the machine operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220.

While the machine-readable medium 1222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and system for performing automated transactions have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:

responsive to a client application requesting that a first script be executed, executing the first script on a first script-engine associated with a first server, the first script-engine including a first server-specific command interface and a first script-interchange interface, wherein the executing performs an automated business transaction having multiple operations, a subset of which are key operations, the first script having a plurality of script commands corresponding to the multiple operations of the business transaction, the business transaction including, the first script-engine prompting a user to input data for the key operations of the business transaction, capturing the data at the first script-engine, the first script-engine providing a first one or more script commands to the first server via the first server-specific command interface, the first one or more script commands provided in a first format specific to the first server, the first script-engine providing via the first script-interchange interface a second one or more script commands to a second script-engine associated with a second server, the second one or more script commands provided in a common script-interchange format for communication between script-engines, the first script-engine receiving respective prompts for the data from the first server and from the second script-engine, and in response to the prompts from the first server and the second script-engine, the first script-engine automatically providing the captured data to the first server and the second script-engine without user interaction, wherein the first server performs the key operations, including initiating a first user session based on the first one or more script commands, wherein the first user session provides the captured data from the first script-engine to a first database, and wherein the second server initiates a second user session based on the second one or more script commands, wherein the second user session provides the captured data from the first script-engine to a second database.

2. The method of claim 1, wherein the data is directly related to an end-goal of the business transaction.

3. The method of claim 1, wherein one or more of the multiple operations require other data, the business transaction further including retrieving the other data automatically and without user interaction.

4. The method of claim 3, wherein the other data is retrieved from a source external to the first server.

5. The method of claim 3, wherein the source external to the first server is the second server associated with the second script-engine.

6. The method of claim 1, further comprising the second script-engine communicating a result to the first script-engine.

7. The method of claim 6, wherein the result communicated to the first script-engine by the second script-engine is additional data for operations of the automated business transaction other than the key operations.

8. The method of claim 7, wherein the additional data is not directly related to the end-goal of the business transaction, but necessary to complete the transaction.

9. The method of claim 6, wherein both the first script-engine and the second script-engine access scripts stored in a library of scripts.

10. The method of claim 1, wherein the prompting of the user to input data includes prompting a user to input a location of a file containing the data.

11. The method of claim 1, wherein the first script is stored on a client.

12. The method of claim 1, wherein the first script is stored on a server.

13. The method of claim 1, wherein the first script is one of a plurality of scripts stored in a library of scripts.

14. A system including:
a first script-engine, configured to execute a first script in response to a request from a client application requesting that the first script be executed, the first script having a plurality of script commands corresponding to the multiple operations of an automated business transaction, wherein a subset of the multiple operations are key operations, wherein the first script-engine prompts a user to input data for key operations of the business transaction, the first script-engine further to capture the data, the first script-engine including,
 a first server-specific command interface configured to provide a first set of script commands, and
 a first script-interchange interface configured to provide a second set of script commands to a second script-engine associated with a second server, the second set of script commands provided by the first script-interchange interface in a common script-interchange format for communication between script-engines; and
a first server connected to the first script-engine, the first server configured to receive the first set of script commands provided by the first server-specific command interface, the first server configured to automatically perform the key operations of the business transaction using the data;
wherein the first set of script commands are provided by the first server-specific command interface in a first format specific to the first server, wherein the first script-engine is further configured to receive from the first server and from the second-script engine respective prompts for the data, wherein the first script-engine is further configured to provide the captured data to each of the first server and the second script-engine, the providing the respective copies of the captured critical data in response to the respective prompts by the first server and the second script-engine without user interaction, wherein the first server is further configured to perform the key operations, including initiating a first user session based on the first one or more script commands, wherein the first user session is configured to provide the captured data from the first script-engine to a first database, the second server further configured to initiate a second user session based on the second one or more script commands, wherein the second user session is configured to provide the captured data from the first script-engine to a second database.

15. The system of claim 14, wherein the data is directly related to an end-goal of the business transaction.

16. The system of claim 14, wherein one or more of the multiple operations require other data, and wherein the first script-engine further to retrieve the other data automatically and without user interaction.

17. The system of claim 16, wherein the other data is retrieved from a source external to the first server.

18. The system of claim 17 further including the second server, wherein the second server is to store the other data.

19. The system of claim 14 further comprising the second script-engine, wherein the second script-engine is configured to communicate a result to the first script in response to the data first script-engine providing the respective copy of the data to the second script-engine.

20. The system of claim 19, wherein the result communicated to the first script-engine by the second script-engine is additional data for operations of the automated business transaction other than the key operations.

21. The system of claim 20, wherein the additional data is not directly related to an end-goal of the business transaction, but necessary to complete the business transaction.

22. The system of claim 19 including a library of scripts wherein both the first script-engine and the second script-engine access scripts stored in the library of scripts.

23. The system of claim 14, wherein the first script-engine is to prompt a user to input a location of a file containing the data.

24. The system of claim 14 wherein the first script is stored on a client.

25. The system of claim 14 wherein the first script is stored on the first server.

26. The system of claim 14 wherein the first script is stored in a library of scripts.

* * * * *